United States Patent [19]
Barney

[11] 4,085,479
[45] Apr. 25, 1978

[54] TOOL FOR REMOVAL AND REPLACEMENT OF CASTER SPRINGS

[76] Inventor: Rodney L. Barney, 2776 Crest Rd., Atwater, Calif. 95301

[21] Appl. No.: 801,679

[22] Filed: May 31, 1977

[51] Int. Cl.² ............................................. B60B 33/00
[52] U.S. Cl. .......................................... 16/45; 29/227; 254/10.5; 16/44
[58] Field of Search ................. 16/45, 44, 19; 29/215, 29/217, 218, 225, 227; 254/10.5

[56] References Cited
U.S. PATENT DOCUMENTS

| 634,974 | 10/1899 | Baker | 16/44 X |
|---|---|---|---|
| 3,270,367 | 9/1966 | Loos | 16/44 X |
| 4,006,893 | 2/1977 | Spencer | 254/10.5 X |
| 4,009,867 | 3/1977 | Diffenderfer | 29/227 X |

*Primary Examiner*—Dorsey Newton

*Attorney, Agent, or Firm*—Joseph E. Rusz; Arsen Tashjian

[57] ABSTRACT

A spring compressing tool including a plate having three spaced holes therein. A center hole is provided to allow access to the locking nut of the caster assembly and two other holes in the plate are in alignment with two already available holes in the caster flange. Two elongated threaded studs extend through the aligned holes in the plate and flange elements with nuts engaging the threaded portions above the plate and below the flange holding the spring compressed and the outer and inner cylinders in a fixed relative position while the locking nut of the caster is removed. Loosening of the nuts on the elongated studs allows the outer cylinder to move upward causing the pressure on the caster spring to be relived gradually until the spring is fully expanded and can be safely removed. The spring is replaced in the caster assembly by reversing the procedure outlined.

1 Claim, 3 Drawing Figures

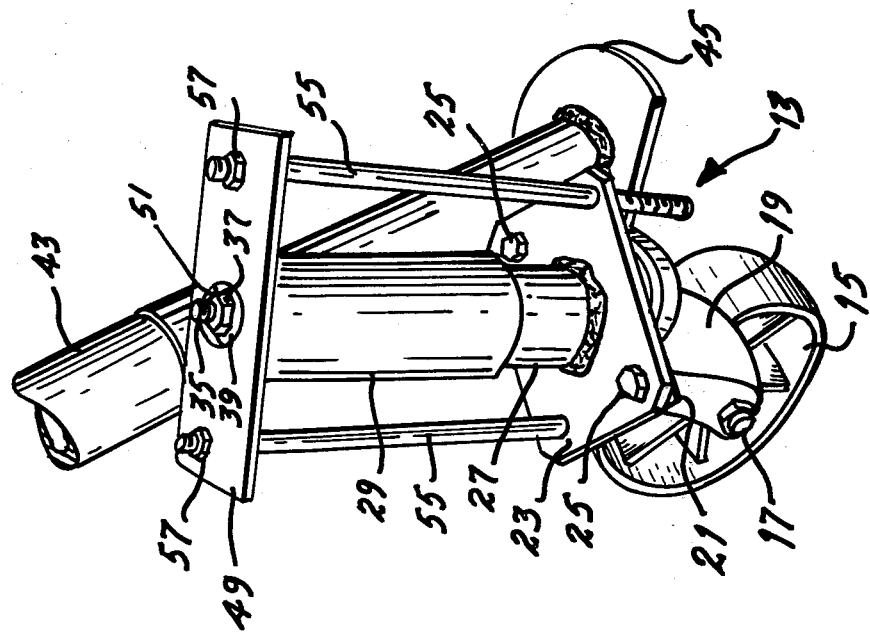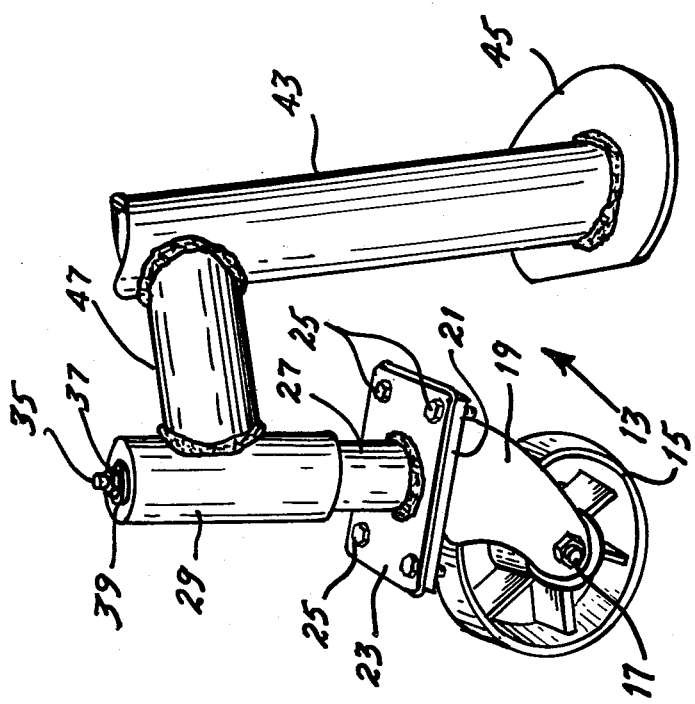

TOOL FOR REMOVAL AND REPLACEMENT OF CASTER SPRINGS

STATEMENT OF GOVERNMENT INTEREST

The invention described herein may be manufactured and used by or for the Government for governmental purposes without the payment of any royalty thereon.

BACKGROUND OF THE INVENTION

This invention relates to a tool for simplifying the task of removing and/or installing the foot assembly spring on a tripod jack and, more particularly, the invention is concerned with providing a tool suitable for replacing the spring in a sprung caster while the assembly is still attached to the jack leg without the need for machine shop equipment and associated paper work.

Heretofore on a rolling tripod jack of 20 to 30 ton capacity, when it becomes necessary to change the spring casters, the foot assembly first must be removed from the assembled jack. This procedure takes two men approximately two hours to accomplish. After the required paper work is processed and the foot assembly is transported to the machine shop which takes another hour of time, the shop people must disassemble and reassemble the foot assembly by placing the caster foot in an inverted position under the spindle of a large drill press. After several operations the old spring can be removed. The new spring is placed in the caster foot cavity formed by the inner cylinder and the outer cylinder is placed over the inner cylinder. The upper or outer cylinder is then forced downward with the drill press until the threaded stem protrudes through the hole in the upper cylinder. The required nut, washer, lock nut and cotter pin are installed on the threaded stem and the pressure on the spring is removed by disengaging the drill press. From the foregoing description of the present practice of replacing caster springs, it can be seen that approximately six man hours are required to service a single jack.

In the hereinafter described tool for removing and replacing caster springs only one-half hour is required to service a jack. The improved procedure permits the caster assembly to be servied in the jack maintenance shop without any special machinery by relatively unskilled personnel. The procedure is simple and safe and saves a great deal of time and effort while still producing the desired result.

SUMMARY OF THE INVENTION

The invention is concerned with providing a tool for removing and replacing the spring element of a sprung caster used on heavy duty tripod jacks. The tool includes a plate with three holes, one in the center to allow the locking nut of the caster assembly to protrude therethrough and two others aligned with holes already available in the caster flange. Two elongated threaded studs extend through the aligned holes in the plate and caster flange with nuts engaging the threaded portions above the plate and below the flange. This arrangement maintains the inner and outer cylinders of the caster assembly in a fixed relative position so that the center locking nut can be removed, after which the threaded studs are gradually loosened allowing the upper cylinder to move upward and safely relieve the pressure on the spring so that the assembly can be disassembled.

Accordingly, it is an object of the invention to provide an improved tool for removing and replacing the spring in a spring caster in a quick and simple manner without the use of special machinery.

Another object of the invention is to provide a tool for replacing a coil spring in the caster assembly of a heavy duty tripod jack by relieving the spring pressure so that the caster assembly can be disassembled safely and easily.

Still another object of the invention is to provide a special tool for disassembling a caster foot assembly utilizing available holes in the caster flange. The tool includes a plate and elongated threaded studs which pass through the holes in the caster flange.

A further object of the invention is to provide a spring compressing tool for simplifying the task of installing and/or removing the foot assembly spring of a 20 to 30 ton tripod jack. The tool allows the task to be performed by one man with the assembly still attached to the jack leg.

These and other objects, features and advantages will become more apparent after considering the following description taken in conjunction with the annexed drawings and appended claims.

BRIEF DESCRIPTION OF THE DRAWINGS

FIG. 1 is a general view of the foot assembly of a 30 ton tripod jack showing the caster attached thereto;

FIG. 2 is a general view of the tripod jack foot assembly with the tool according to the invention installed prior to removal of the locking nut for disassembly of the caster spring assembly.

DESCRIPTION OF A PREFERRED EMBODIMENT

Figure 3:
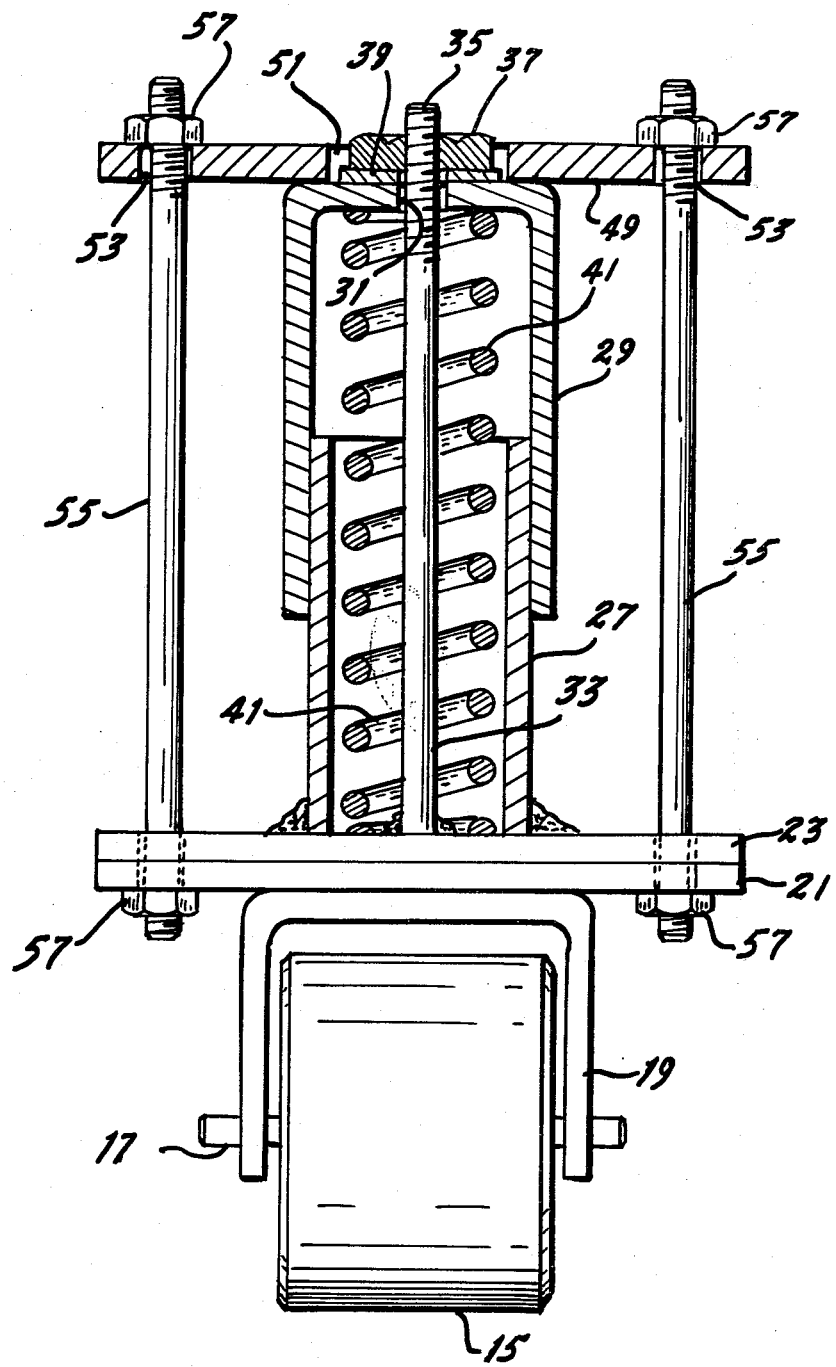
FIG. 3 is an enlarged view in partial cross-section showing the internal portion of the caster assembly with the tool attached for removal and replacement of the caster spring.

Referring now to the drawings in which like reference numerals refer to like elements in the several views, there is shown a caster assembly 13 including a wheel 15 which rotates around the axle 17. An inverted U-shaped bracket or yoke 19 provides a mounting for the wheel 15 which is journalled therein by means of the axle 17. The bracket 19 is pivotally attached to the caster plate 21 which is provided with four bolt holes, one in each corner. A jack plate 23 includes four bolt holes in alignment with the ones in the caster plate 21 and four suitable bolts 25 pass through the aligned holes for holding the plates 21 and 23 fixedly together.

An inner cylinder 27 is fixedly attached to the upper surface of the jack plate 23 by welding or some other suitable means. The inner cylinder 27 extends upwardly from the jack plate 23 with the upper end thereof being open and uncovered. An outer cylinder 29 is dimensioned to fit over the outer diameter of the inner cylinder 27 for slidable movement thereover. The upper end of the outer cylinder 29 is closed except for a central aperture 31. An elongated rod 33 having the upper end thereof provided with the thread 35 is fixedly attached to the center of the upper surface of the jack plate 23 by welding or some other suitable means and extends axially upward therefrom. A suitable nut 37 and washer 39 are threaded over the upper end of the rod 33 which extends through the central aperture 31 in the outer cylinder 29 thereby preventing the outer cylinder 29 from becoming disengaged from the inner cylinder 27. An helical compression spring 41 (shown in FIG. 3) is positioned around the rod 33 inside the inner and outer cylinders 27 and 29.

The tripod jack on which the caster assembly 13 is mounted includes the leg 43 with the foot 45 attached to the lower end thereof. An arm 47 extends laterally from the side of the leg 43 to the side of the outer cylinder 29 and maintains the caster assembly 13 in a fixed spaced position relative to each of the legs 43 of the tripod jack.

In the preferred embodiment of the invention, the special tool used to remove and/or replace the compression spring 41 in the caster assembly 13 is shown in FIGS. 2 and 3. A plate 49 which is substantially rectangular in configuration is provided with a central opening 51 large enough to clear the nut and washer 37 and 39 so that the plate 51 can rest on the top surface of the outer cylinder 29. Two other holes 53 are provided in the plate 49 in alignment with two diagonally opposite bolts 25 in the caster and jack plates 21 and 23. With the proper two bolts 25 removed, two elongated threaded studs 55 can be inserted through the bolt holes in the caster and jack plates 21 and 23 and through the aligned holes 53 in the plate 49. The nuts 57 can be threaded onto each end of the studs 55 thereby maintaining the inner and outer cylinders 27 and 29 in a fixed relative position to one another even when the lock nut 37 is removed.

In operation, to remove and replace a worn, broken or defective spring 41, the tool is attached as shown in FIGS. 2 and 3 by removing two opposite corner caster bolts 25 and placing the elongated threaded rods 33 into the bolt holes. The plate 49, preferably fabricated of steel, is placed across the top of the outer cylinder 29 with the nut and washer 37 and 39 in the central opening 51. The nuts 57 are then tightened down on the threaded rod 33 to relieve the pressure on the nut 37 produced by the compression spring 41. The nut and washer 37 and 39 are then removed and the nuts 57 are loosened to relieve the pressure from the spring 41. After the spring pressure has been relieved the outer cylinder 29 can be lifted off and the spring 41 removed and replaced. By reversing the procedure outlined, the new spring can be installed and the caster assembly reassembled.

It should be clear that the hereinbefore described tool provides a great savings in time and effort when it becomes necessary to replace a caster spring. The tool can be easily produced in quantity from readily available materials so that each mechanic and/or jack maintenance shop could be provided with one. No special skills are required in order to use the tool and the need for special heavy duty machinery, such as drill presses, is eliminated. Also, the time required for moving the tripod jacks and caster a-semblies to the machine shops is no longer needed.

Although the invention has been illustrated in the accompanying drawings and described in the foregoing specification in terms of a preferred embodiment thereof, the invention is not limited to this embodiment or to the preferred configuration shown. It will be apparent to those skilled in the art that my invention could have extensive use in other operations where it is necessary to remove and replace springs under compression by holding the assembly under pressure while the securing means are removed and the spring pressure can be gradually relieved.

Having thus set forth the nature of my invention, what I claim and desire to secure by Letters Patent of the United States is:

1. In combination, a caster assembly including a wheel journalled to a bracket attached to a caster plate having a plurality of holes therein, a jack plate having a corresponding plurality of holes in alignment with the holes in said caster plate, a bolt received in each of two opposing aligned holes in said caster and jack plates, an inner cylinder fixedly attached to the upper surface of said jack plate and extending upwardly therefrom, an outer cylinder slidably positioned over said inner cylinder, said outer cylinder being closed at the upper end and having a central aperture through the upper surface thereof, an elongated rod fixedly attached to the upper surface of said jack plate and extending axially upward through the center of said inner and outer cylinders, the upper end of said rod being threaded and extending through the aperture in said outer cylinder, an helical compression spring positioned inside said inner and outer cylinders around said rod urging said outer cylinder upward, a nut engaging the threads on said rod for maintaining said outer cylinder in a downward position, and a tool for removing and replacing said helical compression spring comprising a rectangular plate having a central opening therein for clearing the nut on said elongated rod, the bottom surface of said rectangular plate in contact with the top surface of said outer cylinder, two holes in said rectangular plate in alignment with two other opposing aligned holes in said caster and jack plates, two elongated threaded studs extending through the other aligned holes in said rectangular plate and said caster and jack plates, a nut threaded on each end of each stud to maintain said inner and outer cylinders in a fixed relative position while the nut on the elongated rod is removed, the nuts on said studs being loosended to allow said outer cylinder to move upward and relieve the pressure on said helical compression spring thereby permitting the spring to be removed and the caster assembly to be disassembled.

* * * * *